United States Patent
Shi et al.

(10) Patent No.: US 12,473,853 B2
(45) Date of Patent: *Nov. 18, 2025

(54) SYSTEMS AND METHODS FOR DIAGNOSING COMPONENT FAILURE

(71) Applicant: Cummins Inc., Columbus, IN (US)

(72) Inventors: Haifeng Shi, Wuhan (CN); Yang Z. Zhou, Wuhan (CN); Chengxiu Huang, Hubei (CN)

(73) Assignee: Cummins Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,484

(22) Filed: May 28, 2024

(65) Prior Publication Data

US 2024/0318585 A1 Sep. 26, 2024

Related U.S. Application Data

(63) Continuation of application No. 18/236,577, filed on Aug. 22, 2023, now Pat. No. 12,031,464.

(30) Foreign Application Priority Data

Aug. 23, 2022 (CN) .......................... 202211013992.2

(51) Int. Cl.
*F01N 11/00* (2006.01)
*F01N 3/20* (2006.01)
*F01N 9/00* (2006.01)
*F02D 41/02* (2006.01)
*F02D 41/14* (2006.01)
*F02D 41/22* (2006.01)

(52) U.S. Cl.
CPC .......... *F01N 11/002* (2013.01); *F01N 3/2066* (2013.01); *F02D 41/0235* (2013.01);
(Continued)

(58) Field of Classification Search
CPC combination set(s) only.
See application file for complete search history.

(56) References Cited

U.S. PATENT DOCUMENTS 6,405,818 B1 6/2002 Anthony et al.
7,886,523 B1 * 2/2011 Legare ............. F02M 35/10386
60/276

(Continued)

FOREIGN PATENT DOCUMENTS

WO WO-2019/046182 A1 3/2019
WO WO-2021/061931 A1 4/2021

OTHER PUBLICATIONS

Notice of Allowance on U.S. Appl. No. 18/236,577 Dtd Feb. 28, 2024.

*Primary Examiner* — Binh Q Tran
(74) *Attorney, Agent, or Firm* — Foley & Lardner LLP

(57) ABSTRACT

Systems and methods for diagnosing at least one component in an exhaust aftertreatment system are provided. The system includes an exhaust aftertreatment system coupled to an engine system, at least one sensor, and at least one processing circuit structured to: receive initial sensor data; determine an initial parameter value based on the initial sensor data; determine that the initial parameter does not satisfy an initial threshold; perform operations to diagnose at least one component of the exhaust aftertreatment system comprising: causing the engine system to operate through a sequence of a plurality of engine outputs; receiving a plurality of sensor data, each of the plurality sensor data corresponding to at least one of the plurality of engine outputs; comparing each of the plurality of sensor data to a corresponding threshold; and diagnosing the at least one component based on the comparison.

20 Claims, 5 Drawing Sheets

(52) U.S. Cl.
CPC .............. *F01N 9/005* (2013.01); *F01N 9/007* (2013.01); *F01N 11/007* (2013.01); *F01N 2550/02* (2013.01); *F01N 2550/03* (2013.01); *F01N 2550/20* (2013.01); *F01N 2560/02* (2013.01); *F01N 2610/1453* (2013.01); *F01N 2900/04* (2013.01); *F01N 2900/0416* (2013.01); *F01N 2900/06* (2013.01); *F02D 41/1495* (2013.01); *F02D 41/222* (2013.01); *F02D 2200/08* (2013.01)

(56) References Cited

U.S. PATENT DOCUMENTS

| | | |
|---|---|---|
| 9,651,454 B2 | 5/2017 | Rimkus |
| 10,329,986 B2 | 6/2019 | Wang et al. |
| 10,507,824 B2 | 12/2019 | Cho |
| 11,732,632 B1* | 8/2023 | Ethington .............. F01N 11/002 60/277 |
| 12,031,464 B2* | 7/2024 | Shi ........................ F01N 3/2066 |
| 2003/0070420 A1 | 4/2003 | Uchida |
| 2010/0319667 A1 | 12/2010 | Yoshikawa et al. |
| 2011/0146240 A1* | 6/2011 | Wilhelm .................. F01N 3/208 60/287 |
| 2012/0203411 A1 | 8/2012 | Mallebrein et al. |
| 2013/0078725 A1 | 3/2013 | Makki et al. |
| 2015/0086428 A1 | 3/2015 | Kitaura et al. |
| 2017/0203755 A1* | 7/2017 | Sugiyama ............. B60W 10/08 |
| 2019/0249640 A1* | 8/2019 | Miller ................... B60W 20/15 |
| 2020/0347770 A1 | 11/2020 | Mendoza-Pinon et al. |
| 2021/0404368 A1* | 12/2021 | Nakagawa ............ F01N 11/007 |

* cited by examiner

── 350

| Before Third Output | | After Third Output | | |
|---|---|---|---|---|
| Data 1 ✗ | Data 2 ✓ | Data 3 ✓ | Data 4 ✓ | Failure type 1 |
| Data 1 ✗ | Data 2 ✓ | Data 3 ✗ | Data 4 ✓ | Failure type 2 |
| Data 1 ✗ | Data 2 ✗ | Data 3 ✓ | Data 4 ✓ | Failure type 3 |
| Data 1 ✗ | Data 2 ✗ | Data 3 ✗ | Data 4 ✗ | Failure type 4 → To 402 |

FIG. 3B

SYSTEMS AND METHODS FOR DIAGNOSING COMPONENT FAILURE

CROSS REFERENCE TO RELATED APPLICATIONS

This application is a continuation of U.S. patent application Ser. No. 18/236,577, filed Aug. 22, 2023, which claims the benefit of and priority to Chinese Application No. 2022110139922, filed on Aug. 23, 2022, all of which are incorporated herein by reference in their entireties and for all purposes.

TECHNICAL FIELD

The present disclosure relates to exhaust aftertreatment systems. More particularly, the present disclosure relates to systems and methods for diagnosing component failure or potential component failure in exhaust aftertreatment systems using an onboard controller or control system.

BACKGROUND

Many engines are coupled to exhaust aftertreatment systems that reduce harmful exhaust gas emissions (e.g., nitrous oxides (NOx), sulfur oxides, particulate matter, etc.). One or more components of the exhaust aftertreatment system may, over time, degrade in performance and require maintenance and/or replacement. Onboard sensors and diagnostic systems may be used to monitor performance of the one or more components in order to determine when maintenance may be needed. Timely and accurate diagnosis and maintenance may be important to helping keep the exhaust aftertreatment system along with its various systems and devices operating as desired.

SUMMARY

One embodiment relates to a system. The system includes an exhaust aftertreatment system coupled to an engine system such that the exhaust aftertreatment system receives exhaust gas from the engine system, at least one sensor, and at least one processing circuit. The at least one processing circuit is structured to: receive, from the at least one sensor, initial sensor data; determining an initial parameter value based on the initial sensor data; determine that the initial parameter does not satisfy an initial threshold; responsive to determining that initial parameter does not satisfy the initial threshold, perform operations to diagnose the at least one component of the exhaust aftertreatment system, the operations comprising: causing the engine system to operate through a sequence of a plurality of engine outputs; receiving, from the at least one sensor, a plurality of sensor data, each of the plurality sensor data corresponding to at least one of the plurality of engine outputs; comparing each of the plurality of sensor data to a corresponding threshold of a plurality of thresholds; diagnosing the at least one component based on the comparison between the plurality of sensor data and the plurality of thresholds, the diagnosis indicating a failure type.

Another embodiment relates to a method for diagnosing at least one component in an exhaust aftertreatment system. The method includes: receiving initial sensor data; determining an initial parameter value based on the initial sensor data; determining that the initial parameter does not satisfy an initial threshold; responsive to determining that the initial parameter does not satisfy the initial threshold, performing operations to diagnose the at least one component of the exhaust aftertreatment system, the operations comprising: causing an engine to operate through a sequence of a plurality of engine outputs; receiving a plurality of sensor data, each of the plurality sensor data corresponding to at least one of the plurality of engine outputs; comparing each of the plurality of sensor data to a corresponding threshold of a plurality of thresholds; and diagnosing the at least one component based on the comparison between the plurality of sensor data and the plurality of thresholds, the diagnosis indicating a failure type.

Still another embodiment relates to an apparatus for diagnosing at least one component in an exhaust aftertreatment system. The apparatus includes at least one processor and at least one memory device storing instructions that, when executed by the at least one processor, cause the at least one processor to: receive initial sensor data; determine an initial parameter value based on the initial sensor data; determine that the initial parameter does not satisfy an initial threshold; responsive to determining that the initial parameter does not satisfy the initial threshold, perform operations to diagnose the at least one component of the exhaust aftertreatment system, the operations comprising: causing an engine to operate through a sequence of a plurality of engine outputs; receiving a plurality of sensor data, each of the plurality sensor data corresponding to at least one of the plurality of engine outputs; comparing each of the plurality of sensor data to a corresponding threshold of a plurality of thresholds; and diagnosing the at least one component based on the comparison between the plurality of sensor data and the plurality of thresholds, the diagnosis indicating a failure type.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 3B is a lookup table for the method of FIG. 3A, according to an example embodiment.

DETAILED DESCRIPTION

Figure 1:
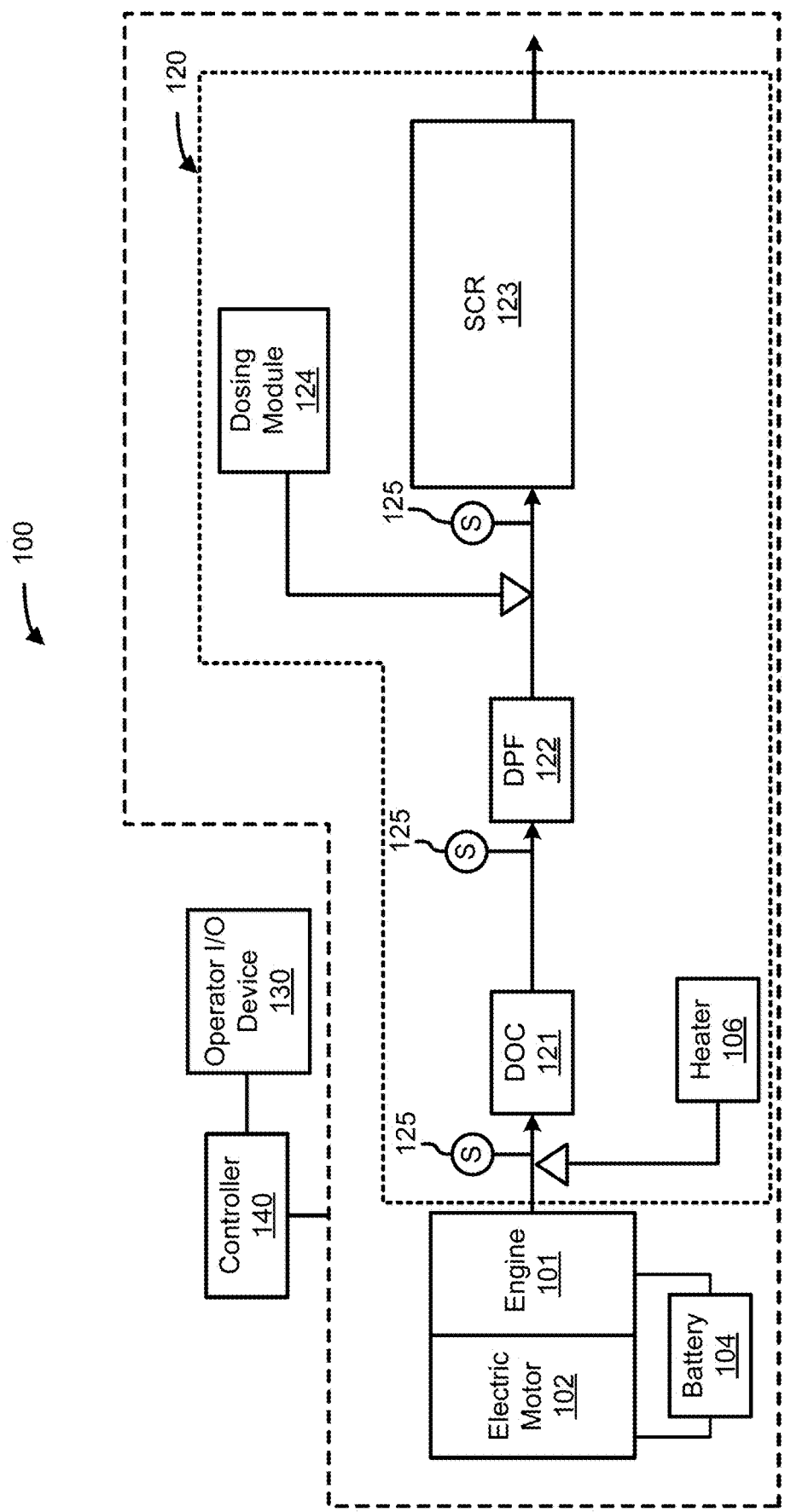
FIG. 1 is a schematic view of a block diagram of a vehicle system of a vehicle, according to an example embodiment.

Following below are more detailed descriptions of various concepts related to, and implementations of, methods, apparatuses, and systems for monitoring, diagnosing, reporting, and/or correcting component failure or potential component failure in an exhaust aftertreatment system. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As described herein, an exhaust gas aftertreatment system may include one or more components, such as a particulate filter configured to remove particulate matter, such as soot, from exhaust gas flowing in the exhaust gas conduit system, a dosing module (e.g., a doser) configured to supply a dosing fluid to the exhaust gas flowing in the exhaust gas system, and one or more catalyst devices configured to facilitate conversion of the exhaust gas constituents (e.g., NOx) to less harmful elements (e.g., water), such as a diesel oxidation catalyst, a selectively catalytic reduction system, a three-way catalyst, and so on. A control system or controller may monitor one or more parameters of the components of the exhaust aftertreatment system using one or more sensors (e.g., actual sensors and/or virtual sensors) to collect and/or determine sensor data. The control system may analyze the sensor data and compare the analyzed sensor data with one or more thresholds. The control system may determine that one or more of the components of the exhaust aftertreatment system may have failed or likely failed and, in turn, may require maintenance based on the analyzed sensor data exceeding a maximum threshold, being below a minimum threshold, or otherwise not falling with a desired/acceptable range. The control system may initialize a diagnosis operation to determine which of the components of the exhaust aftertreatment system have/has failed and/or a failure type based on this determination. As described herein, the component may be a SCR, a dosing unit, and/or other components.

Technically and beneficially, the systems, methods, and apparatuses described herein provide an improved control system that uses sensor data to determine if a component of an aftertreatment system has failed and a type of failure. The control system described herein advantageously utilize a particular control strategy to diagnose the component(s) of the exhaust aftertreatment system while the vehicle is in operation. That is, the systems and methods described herein provide a technical solution to the technical problem of diagnosing aftertreatment system components by using a particular computer-based process that advantageously occurs while the vehicle is operating and without interrupting the normal operation of the vehicle. Advantageously, the diagnosis of the component(s) of the exhaust aftertreatment system may be provided to a vehicle servicer remote from the vehicle (e.g., an original equipment manufacturer, a vehicle dealership, a vehicle repair service, etc.) to facilitate potentially needed repair or maintenance.

In an example scenario, a control system (e.g., a controller, a vehicle controller, etc.) utilizes one or more sensors (e.g., real sensors and/or virtual sensors) to detect one or more operating parameters of an exhaust aftertreatment system component, such as a particulate filter, a selective catalytic reduction (SCR) system, and/or a dosing module or unit. The control system may analyze sensor data collected and/or generated by the one or more sensors. Analyzing the sensor data may include using one or more statistical models, such as a regression model, a machine learning model, etc., to determine one or more parameters of the component. The control system may compare the one or more parameters with a respective threshold, and determine, based on the comparison (such as a parameter exceeding a respective maximum threshold or a parameter being below a minimum threshold), that one or more of the exhaust aftertreatment system components has failed or has likely failed. The control system may initialize a diagnosis operation to determine which component has failed, and a type of failure. The diagnosis operation may include adjusting one or more engine outputs, using one or more sensors to detect sensor data including one or more parameters of the exhaust aftertreatment system component(s), and determining, based on analyzing the sensor data, the component(s) that failed or likely failed and a failure type.

Additionally, the improved control system described herein may be part of a hybrid vehicle system. Advantageously the control system may adjust the operation of a hybrid engine system, for example, by adjusting the reliance of an electric motor of the hybrid vehicle. More specifically, the control system may advantageously increase the usage of the electric motor to propel the hybrid vehicle if the aftertreatment system component (e.g., the SCR) has failed or likely failed. Increasing the usage of the electric motor advantageously reduces the usage of an internal combustion engine thereby reducing exhaust gas emissions generated by the internal combustion engine.

Referring now to FIG. 1, a system 100 is shown, according to an example embodiment. The system 100 includes an engine 101, an aftertreatment system 120 in exhaust gas receiving communication with the engine 101, an operator input/output (I/O) device 130, and a controller 140, where the controller 140 is communicably coupled to each of the aforementioned components. In the configuration of FIG. 1, the system 100 is included in a vehicle and, particularly, a hybrid vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 101 may be any type of engine that generates exhaust gas, such as a gasoline, natural gas, or diesel engine, and/or any other suitable engine. In the example depicted, the engine 101 is a part of a hybrid engine system having a combination of an internal combustion engine and an electric motor 102 coupled to at least one battery 104. In some embodiments, the hybrid engine system may be configured as a mild-hybrid powertrain, a parallel hybrid powertrain, a series hybrid powertrain, or a series-parallel powertrain. In any of these embodiments, the battery 104 may be electrically coupled to the engine 101, the electric motor 102, and/or another component of the system 100 (e.g., a regenerative braking system, an alternator, etc.), such that the battery 104 is operable to provide electrical power to the electric motor and/or receive electrical power from another component of the system 100.

The aftertreatment system 120 is in exhaust-gas receiving communication with the engine 101. In the example depicted, the aftertreatment system includes a diesel oxidation catalyst (DOC) 121, a diesel particulate filter (DPF) 122, and a selective catalytic reduction (SCR) system 123. In some embodiments, the aftertreatment system 120 includes an ammonia slip catalyst (ASC) (not shown). The DOC 121 is structured to receive the exhaust gas from the engine 110 and to oxidize hydrocarbons and carbon monoxide in the exhaust gas. The DPF 122 is arranged or positioned downstream of the DOC 121 and structured to remove particulates or particulate matter, such as soot, from exhaust gas flowing in the exhaust gas stream. The DPF 122 includes an inlet, where the exhaust gas is received, and an outlet, where the exhaust gas exits after having particulate matter substantially filtered from the exhaust gas. In some implementations, the DPF 122 or other components may be omitted and/or other components added (e.g., a second SCR system having an additional dosing unit or module, multiple DOCs, etc.). Additionally, although a particular arrangement is shown for the aftertreatment system 120 in FIG. 1, the arrangement of components within the aftertreatment system 120 may be different in other embodiments (e.g., the DPF 122 positioned downstream of the SCR 123 and ASC). The DOC 121, the DPF 122, and the SCR 123 may be fluidly coupled by an exhaust gas conduit.

The aftertreatment system 120 may further include a reductant delivery system which may include a decomposition chamber (e.g., decomposition reactor, reactor pipe, decomposition tube, reactor tube, etc.) to convert a reductant into ammonia, shown as a dosing module or unit 124. The reductant may be, for example, urea, diesel exhaust fluid (DEF), Adblue®, a urea water solution (UWS), an aqueous urea solution (e.g., AUS32, etc.), and other similar fluids. The dosing module 124 may include a reservoir, a pump, and a nozzle (and potentially other components or devices). The reservoir may be structured to store the reductant. The pump may be fluidly coupled to the reservoir and the nozzle by a dosing conduit and structured to pump the reductant from the reservoir to the nozzle. The nozzle may provide the reductant to the exhaust gas within the exhaust gas conduit. The reductant fluid is added to the exhaust gas stream to aid in the catalytic reduction. As shown in FIG. 1, the reductant may be injected upstream of the SCR 123 generally (or in particular, the SCR catalyst) by the dosing module 124 such that the SCR catalyst receives a mixture of the reductant and exhaust gas. The reductant droplets then undergo the processes of evaporation, thermolysis, and hydrolysis to form gaseous ammonia within the decomposition chamber, the SCR catalyst, and/or the exhaust gas conduit system, which leaves the aftertreatment system 120.

As indicated above, the aftertreatment system 120 may further include an oxidation catalyst (e.g., the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the conversion efficiency of the DOC 121 exceeds a predefined threshold (e.g. the conversion of HC to less harmful compounds, which is known as the HC conversion efficiency).

The SCR 120 is configured to assist in the reduction of NOx emissions by accelerating a NOx reduction process between the ammonia and the NOx of the exhaust gas into diatomic nitrogen and water. If the SCR catalyst is not at or above a certain temperature, the acceleration of the NOx reduction process is limited and the SCR 120 may not be operating at a level of a desired conversion efficiency (i.e., a value indicative of an amount of reduction of NOx emissions). In some embodiments, this certain temperature is approximately 200-600° C. The SCR catalyst may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.).

When ammonia in the exhaust gas does not react with the SCR catalyst (either because the SCR 120 is below operating temperature or because the amount of dosed ammonia greatly exceeds the amount of NOx), the unreacted ammonia may bind to the SCR catalyst, becoming stored in the SCR 120. This stored ammonia is released from the SCR 120 as the SCR 120 warms, which can cause issues if the amount of ammonia released is greater than the amount of NOx passing through (i.e., more ammonia than needed for the amount of NOx, which can lead to ammonia slip). In some embodiments, the ASC is included and structured to address ammonia slip by removing at least some excess ammonia from the treated exhaust gas before the treated exhaust gas is released into the atmosphere. As exhaust gas passes through the ASC 124, some of unreacted ammonia (i.e., unreacted with NOx) remaining in the exhaust gas is partially oxidized to NOx, which then consequently reacts with the remaining unreacted ammonia to form N2 gas and water. However, similar to the SCR catalyst, if the ASC is not at or above a certain temperature, the acceleration of the NH3 reduction process is limited and the ASC may not be operating at a level of efficiency to meet regulations or desired parameters. In some embodiments, this certain temperature is approximately 250-300° C.

As shown, a plurality of sensors 125 are included in the aftertreatment system 120. The number, placement, and type of sensors included in the aftertreatment system 120 is shown for example purposes only. That is, in other configurations, the number, placement, and type of sensors may differ. The sensors 125 may be NOx sensors, temperature sensors, particulate matter (PM) sensors, flow rate sensors, other exhaust gas emissions constituents sensors, pressure sensors, some combination thereof, and so on. The PM sensors are structured to acquire data indicative of a PM value (e.g., concentration amount, such as parts per million, etc.) at each location that the PM sensor is located. The temperature sensors are structured to acquire data indicative of a temperature value at each location that the temperature sensor is located.

The sensors 125 may be located in or proximate the engine 101, after the engine 101 and before the aftertreatment system 120, after the aftertreatment system 120, in the aftertreatment system as shown (e.g., coupled to the DPF and/or DOC, coupled to the SCR, etc.), upstream of the engine 101, etc. It should be understood that the location of the sensors may vary. In one embodiment, there may be sensors 125 located both before and after the aftertreatment system 120. In one embodiment, at least one of the sensors is structured as exhaust gas constituent sensors (e.g., CO, NOx, PM, SOx, etc. sensors). In another embodiment, at least one of the sensors 125 is structured as non-exhaust gas constituent sensors that are used to estimate exhaust gas emissions (e.g., temperature, flowrate, pressure, etc.). Additional sensors may be also included with the system 100. The sensors may include engine-related sensors (e.g., torque sensors, speed sensors, pressure sensors, flowrate sensors, temperature sensors, etc.). The sensors may further sensors associated with other components of the vehicle (e.g., speed sensor of a turbo charger, fuel quantity and injection rate sensor, fuel rail pressure sensor, etc.).

The sensors 125 may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 140 indicative of the speed of the engine 101. When structured as a virtual sensor, at least one input may be used by the controller 140 in an algorithm, model, lookup table, etc. to determine or estimate a parameter of the engine (e.g., power output, etc.). Any of the sensors 125 described herein may be real or virtual.

The controller 140 is coupled and, particularly communicably coupled, to the sensors 125. Accordingly, the controller 140 is structured to receive data from one more of the sensors 125 and provide instructions/information to the one or more sensors 125. The received data may be used by the controller 140 to control one more components in the system 100 and/or for monitoring and diagnostic purposes.

Referring still to FIG. 1, an operator input/output (I/O) device 130 is also shown. The operator I/O device 130 may be coupled to the controller 140, such that information may be exchanged between the controller 140 and the I/O device 130, where the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The controller 140 is structured to control, at least partly, the operation of the system 100 and associated sub-systems, such as the engine 101 and the operator I/O device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more electronic control units (ECUs), such as one or more microcontrollers. The controller 140 may be separate from or included with at least one of a transmission control unit, an exhaust aftertreatment control unit, a powertrain control module, an engine control module, etc.

Figure 2:
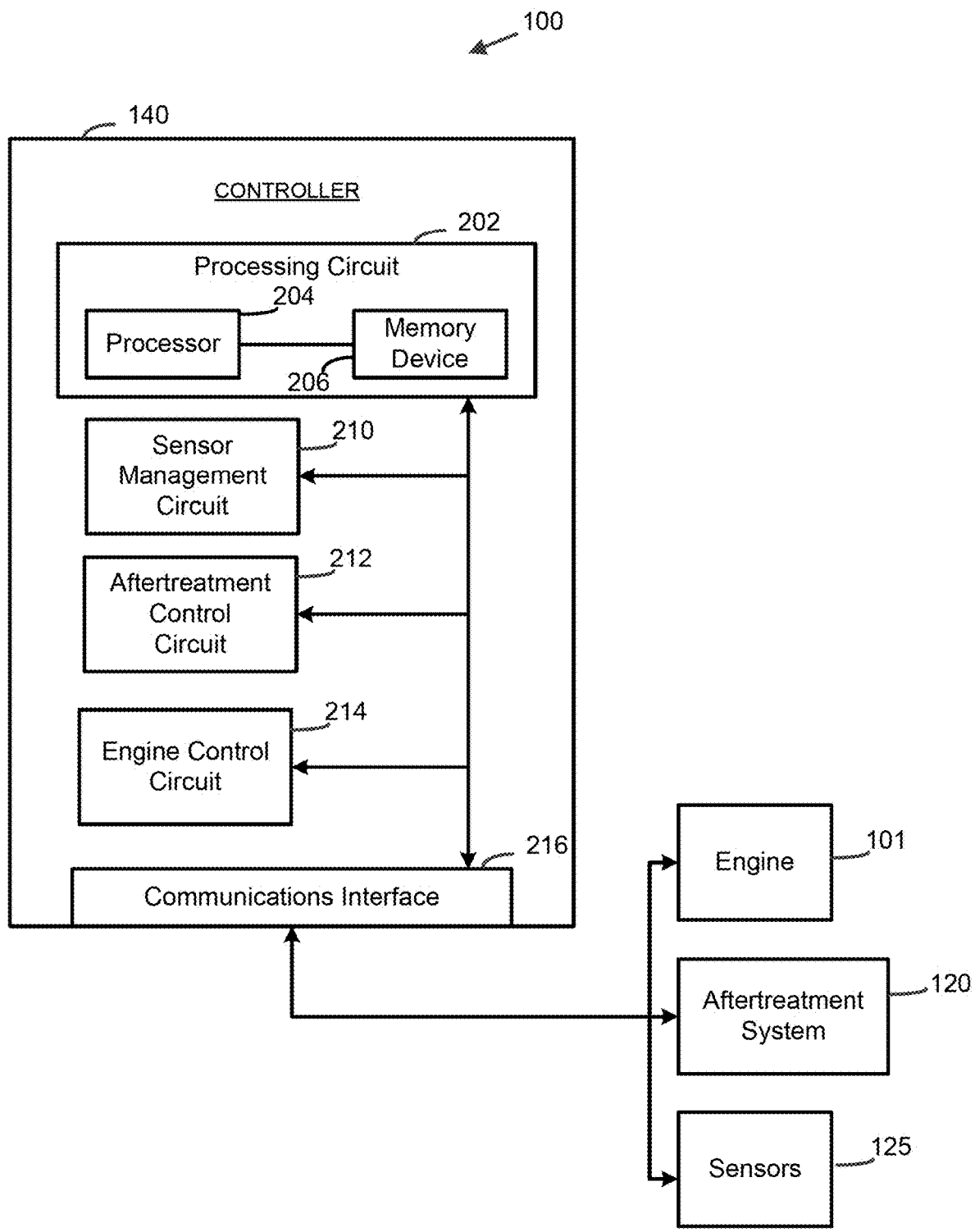
FIG. 2 is a block diagram of the controller of FIG. 1, according to an example embodiment.

Referring now to FIG. 2, a schematic diagram of the controller 140 of the system 100 of FIG. 1 is shown, according to an example embodiment. As shown in FIG. 2, the controller 140 includes at least one processing circuit 202 having at least one processor 204 and at least one memory device 206, a sensor management circuit 210, an aftertreatment control circuit 212, an engine control circuit 214, and a communications interface 216. The controller 140 is structured to monitor, diagnose, and report component failures or likely failures in the aftertreatment system 120 of the system 100. More specifically, the controller 140 may determine that the system 100 is operating abnormally (e.g., one or more parameters are below minimum thresholds, above maximum thresholds, or outside of predefined acceptable threshold ranges), adjust output parameters of the system 100 (e.g., engine 101) to diagnose the operation (e.g., by adjusting the usage of the internal combustion engine and the electric motor of the engine 101) such that the system 100 operates at a target output (e.g., a target exhaust gas temperature, a target running point, and/or a target exhaust flow rate).

In one configuration, the sensor management circuit 210, the aftertreatment control circuit 212, and/or the engine control circuit 214 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor management circuit 210, the aftertreatment control circuit 212, and/or the engine control circuit 214 are embodied as hardware units, such as one or more electronic control units. As such, the sensor management circuit 210, the aftertreatment control circuit 212, and/or the engine control circuit 214 may be embodied as one or more circuitry components including, but not limited to, processing circuitry, network interfaces, peripheral devices, input devices, output devices, sensors, etc. In some embodiments, the sensor management circuit 210, the aftertreatment control circuit 212, and/or the engine control circuit 214 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor management circuit 210, the aftertreatment control circuit 212, and/or the engine control circuit 214 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor management circuit 210, the aftertreatment control circuit 212, and/or the engine control circuit 214 may also include or be programmable hardware devices such as field programmable gate arrays, programmable array logic, programmable logic devices or the like. The sensor management circuit 210, the aftertreatment control circuit 212, and/or the engine control circuit 214 may include one or more memory devices for storing instructions that are executable by the processor(s) of the sensor management circuit 210, the aftertreatment control circuit 212, and/or the engine control circuit 214. The one or more memory devices and processor(s) may have the same definition as provided below with respect to the memory device 206 and processor 204. In some hardware unit configurations, the sensor management circuit 210, the aftertreatment control circuit 212, and/or the engine control circuit 214 may be geographically dispersed throughout separate locations in the vehicle. Alternatively and as shown, the sensor management circuit 210, the aftertreatment control circuit 212, and/or the engine control circuit 214 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the sensor management circuit 210, the aftertreatment control circuit 212, and/or the engine control circuit 214. The depicted configuration represents the sensor management circuit 210, the aftertreatment control circuit 212, and/or the engine control circuit 214 being embodied as machine or computer-readable media storing instructions. However, as mentioned above, this illustration is not meant to be limiting as the present disclosure contemplates other embodiments where the sensor management circuit 210, the aftertreatment control circuit 212, and/or the engine control circuit 214, or at least one circuit of the sensor management circuit 210, the aftertreatment control circuit 212, and/or the engine control circuit 214, is configured as a hardware unit. All such combinations and variations are intended to fall within the scope of the present disclosure.

The processor 204 may be implemented as one or more single- or multi-chip processors, digital signal processors (DSPs), application specific integrated circuits (ASICs), field programmable gate arrays (FPGAs), and/or suitable processors (e.g., other programmable logic devices, discrete hardware components, etc. to perform the functions described herein). A processor may be a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor management circuit 210, the aftertreatment control circuit 212, and/or the engine control circuit 214 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication).

The sensor management circuit 210 is structured or configured to control the operation of the sensors 125. For example, the sensor management circuit 210 may be structured to generate one or more control signals and transmit the control signals to one or more sensors 125 (e.g., to acquire data, etc.). The control signals may cause the one or more sensors 125 to sense and/or detect the sensor data and/or provide the sensor data to the sensor management circuit 210. In some embodiments, the sensor management circuit 210 may be structured to estimate the sensor data (e.g., when the sensors 125 are virtual sensors). The "sensor data" may include temperature data (e.g., exhaust gas temperature, component temperature such as engine temperature, etc.), flow rate data (e.g., exhaust gas flow rate data, charge air flow rate, etc.), pressure data (e.g., engine cylinder pressure, coolant pressure, etc.), and/or other data related to the operation of the system 100.

The aftertreatment control circuit 212 is structured is structured to control the operation of one or more components (e.g., systems, devices, etc.) of the aftertreatment system 120. For example, the aftertreatment control circuit 212 may be structured to control the operation of the dosing module 124. More specifically, the aftertreatment control circuit 212 may be structured to control the operation of a pump of the dosing module 124 such that the aftertreatment control circuit 212 may control an injection amount (e.g., an amount of reductant provided to the aftertreatment system 120) an injection frequency, an injection concentration, and/or other parameters associated with operation of the dosing unit.

The engine control circuit 214 is structured to control, at least partly, operation of the engine 101. For example, the engine control circuit 214 may be structured to control the engine 101 to a desired output value. More specifically, the engine control circuit 214 may be structured to control engine 101 to output an approximate particular exhaust gas temperature value, an approximate exhaust gas flow rate value (e.g., mass flow rate, volumetric flow rate, etc.), an engine speed value (e.g., RPM), an engine torque value, and/or other engine output value. In some embodiments, the desired output value may be one of a plurality of predetermined engine output values. The predetermined engine output values may be stored by the memory device 206.

In some embodiments, the controller 140, or a component there of (e.g., the engine control circuit 214) may set the predetermined engine output values based on a desired range for diagnosing component failures in the exhaust aftertreatment system 120. For example, the controller 140 may control one or more input parameters of the engine 101 to a predetermined parameter that corresponds to a desired engine output. More specifically, the controller 140 may control an engine parameter including one or more of an engine speed, a fuel injection amount, a fuel injection timing, etc. (e.g., an air-to-fuel ratio) that corresponds to at least one of a desired engine NOx output, a desired engine exhaust gas temperature, etc. For example, the controller 140 may control or limit the engine speed to a first value that corresponds with a desired engine exhaust gas temperature. In this way, increasing engine speed (and engine torque) may increase exhaust gas temperatures such that maintaining or keeping the engine speed to at or a below a first predefined level may help to keep exhaust gas temperatures to at or below a first predefined level.

In some embodiments, the engine control circuit 214 may adjust an energy control strategy of the engine 101 to change one or more engine output values. The "energy control strategy" refers to controlling the engine 101 and the electric motor 102 to output a desired power, torque, etc., and may include adjusting the usage of the internal combustion engine and/or the electric motor 102. More particularly, the "energy control strategy" refers to controlling the electric motor 102 and engine 101 to meet various operating demands and/or to implement one or more diagnostic or prognostic processes, such as those described herein. In an example embodiment, the engine control circuit 214 performs these operations during normal operations of the system 100.

In some embodiments, the engine control circuit 214 may increase the usage of the internal combustion engine to increase the exhaust gas temperature value, the exhaust flow rate value, the engine speed, and/or one or more other engine output values. In these embodiments, increasing the usage of the internal combustion engine may include causing an electric system, such as a battery system for powering the electric motor 102, to receive an electric charge from the internal combustion engine. Further, in these embodiments, the engine control circuit 214 may decrease the usage of the electric motor 102 to additionally and/or alternatively increase the usage of the internal combustion engine to, for example, increase an exhaust gas temperature. In some embodiments, the electric motor 102 may be disabled to additionally and/or alternatively increase the use of the internal combustion engine.

In some embodiments, the engine control circuit 214 may decrease the usage of the internal combustion engine to decrease the exhaust gas temperature value, the exhaust flow rate value, and/or other engine output values (e.g., decrease fuel consumption, etc.). In these embodiments, decreasing the usage of the internal combustion engine may include at least partially using the electric motor 102 to propel the vehicle.

In some embodiments, the engine control circuit 214 may decouple the internal combustion engine from a drive train of the vehicle such that the system 100 relies on the electric motor 102 for propelling the vehicle. In these embodiments, the engine control circuit 214 may increase or decrease the usage of the engine 101 without propelling the vehicle.

Figure 3A:
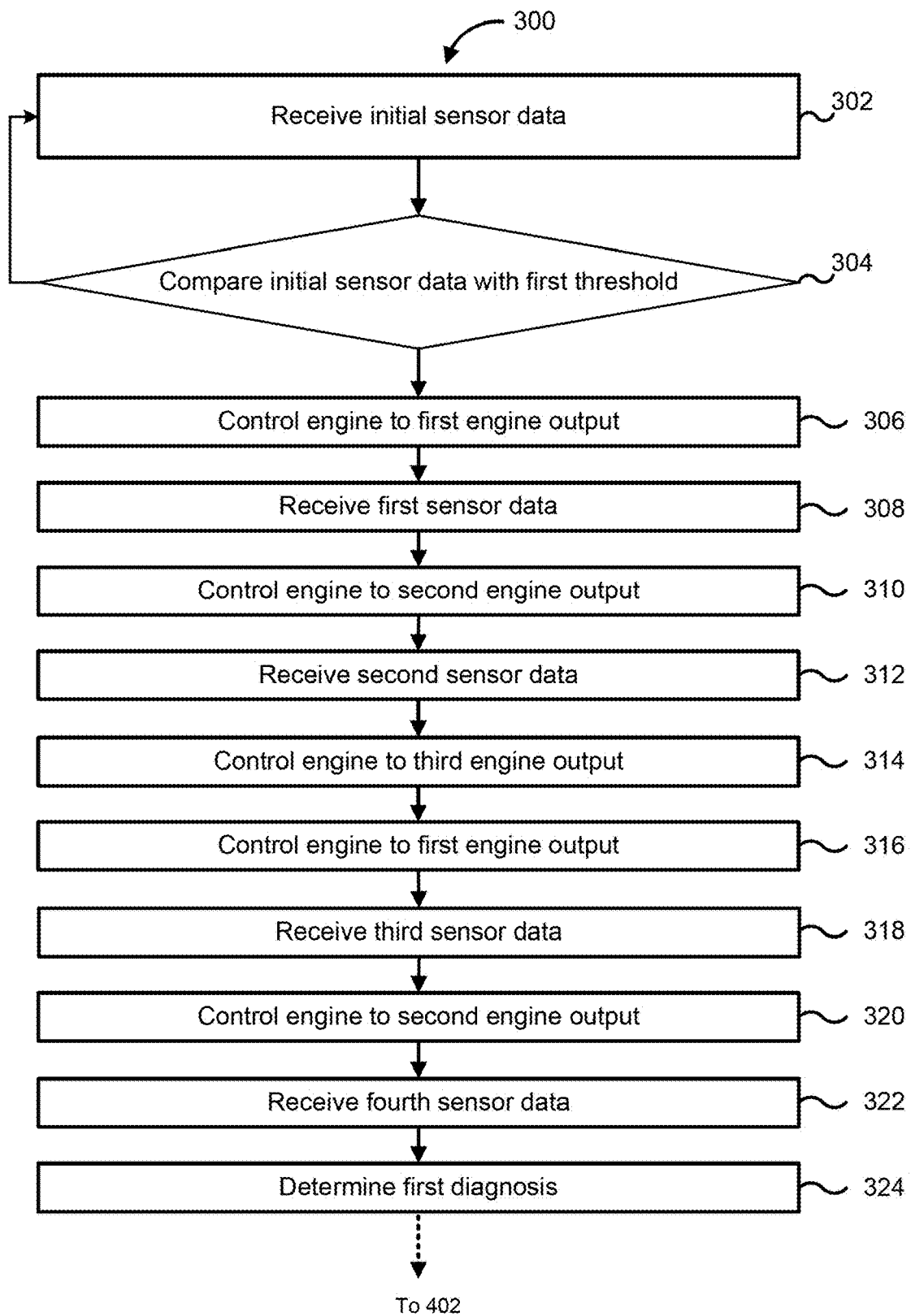
FIG. 3A is a flow diagram of a method of monitoring an aftertreatment system of the vehicle of FIG. 1, according to an example embodiment.
Figure 4:
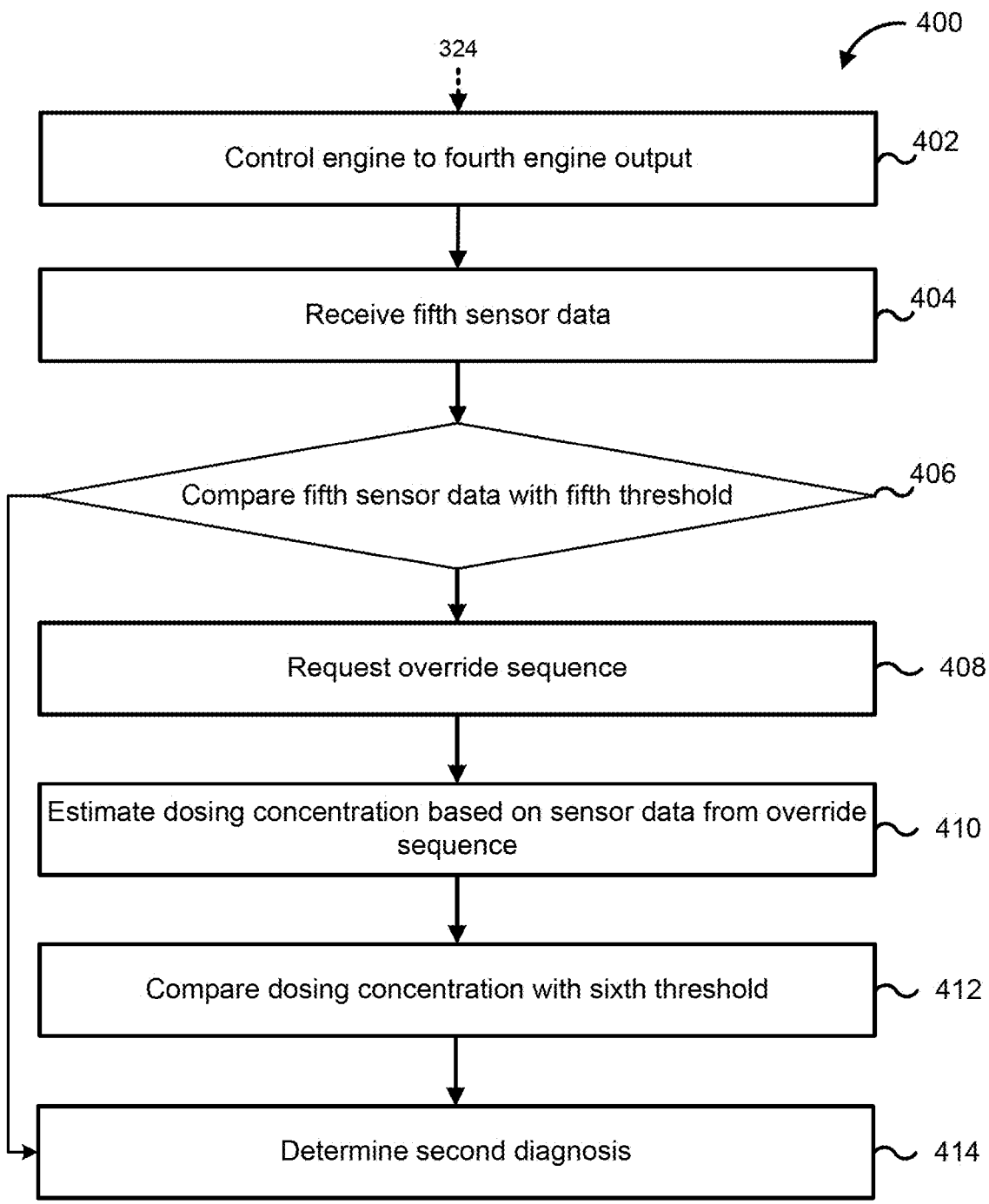
FIG. 4 is a flow diagram of a method of monitoring an aftertreatment system for the vehicle of FIG. 1, according to an example embodiment.

As described in further detail with respect to FIGS. 3A and 4, the controller may determine when to increase or decrease the usage of the engine 101 relative to the electric motor 102 based on a predetermined control sequence for diagnosing the exhaust aftertreatment system 120. The amount of power provided by the engine 101 relative to the electric motor 102 may depend on at least one of the predetermined control sequence, a power amount or torque amount requested by the system 100 to propel the vehicle, or a combination thereof.

In alternative embodiments, the controller 140 may adjust the energy control strategy while the system 100 is in a service facility.

As described in detail herein, the predetermined engine output values may be used to assist diagnosing component failures in the exhaust aftertreatment system 120. For example, the predetermined engine output values may correspond to an aftertreatment system parameter value. The aftertreatment system parameter values refer to parameters or information regarding operation of the aftertreatment system 120, and may include, for example, a NOx reduction (deNOx) value (e.g., an efficiency of NOx reduction determined by the amount of NOx reduced by the SCR 123 per amount of NOx received by the SCR 123, sometimes expressed as a percentage and also referred to as a conversion efficiency (CE) or inefficiency value), a reductant value (e.g., an amount and/or a concentration of the reductant supplied by the dosing module 124), an ammonia to NOx value (e.g., an ammonia to NOx ratio, "ANR"), an engine output value that coincides with an input value or approximate input value for the aftertreatment system 120 (e.g., an engine out NOx value, "EONOx"), a temperature of one or more components of the aftertreatment system 120, and/or other parameter value regarding operation of the aftertreatment system 120. In some embodiments, one or more threshold values may be associated with one or more of the parameter values described above. For example, a desired NOx reduction threshold (e.g., a CE threshold), an ANR threshold, an EONOx threshold, etc. In some embodiments, the thresholds may be a threshold value (e.g., a maximum value, a minimum value, or a target value) and/or a threshold range (e.g., a maximum value and a minimum value).

As described herein, the controller 140 is structured to diagnose component failures in the exhaust aftertreatment system 120. For example, the controller 140 may analyze the sensor data (e.g., data received from the sensors 125 and/or determined via the sensor management circuit 210) to determine one or more parameter values of the exhaust aftertreatment system 120 and/or a component thereof (e.g., the DPF 122, the dosing module 124, etc.). In some embodiments, the sensor data includes one or more parameters regarding operation of the exhaust aftertreatment system 120. In some embodiments, the controller 140 may determine parameter values including an exhaust gas constituent value, such as a NOx value (e.g., a NOx concentration, a CE value, an EONOx value, etc.), by using the sensors 125 to measure and/or estimate these values or provide information to enable the controller 140 to determine these values. In other embodiments, the controller 140 may determine parameter values including one or more fluid parameters of a fluid (e.g., exhaust gas) flowing through the exhaust aftertreatment system 120 and/or a component thereof including, but not limited to a flow rate (e.g., a volumetric flow rate, a mass flow rate, etc.), a pressure change across one or more components, and/or a flow resistance (e.g., a ratio of pressure change to volumetric flow rate), by using the sensors 125 to measure and/or estimate these values or information used to determine these values.

The controller 140 may compare one or more of the parameter values with a respective threshold to diagnose a component of the aftertreatment system 120. The controller 140 may determine that a component of the aftertreatment system 120 has failed and/or is likely to fail based on determining that a parameter value exceeds a respective maximum threshold, is below a minimum threshold, or is outside a threshold range. In an example embodiment, the controller 140 may compare a deNOx efficiency value to a deNOx efficiency threshold (e.g., a minimum deNOx efficiency). The terms deNOx efficiency and conversion efficiency (CE) are used interchangeably herein. The controller 140 may determine that at least one of the components of the aftertreatment system 120 has failed or has likely failed based on the deNOx efficiency value being below the minimum deNOx efficiency, which indicates that less than a desired minimum amount of NOx is being converted to less harmful elements. The controller 140 may determine at least one of (1) the component that failed and (2) a type of failure. The logic used to diagnose component failures is described in more detail herein with respect to FIGS. 3A and 4.

Referring now to FIGS. 3A-3B and FIG. 4, methods 300 and 400 for monitoring and diagnosing components of the aftertreatment system 120 are shown, according to example embodiments. In some embodiments, methods 300 and 400 represent different control processes for determining which component(s) has/have failed and a type of failure. In other embodiments, the methods 300 and 400 may be performed concurrently, partially concurrently, or sequentially. For example, in the embodiments shown in FIGS. 3A and 4, the method 400 is performed sequentially after the method 300.

Based on the foregoing and referring first to FIG. 3A, a flow diagram of a method 300 of monitoring and diagnosing one or more components of the aftertreatment system 120 is shown, according to an example embodiment. In some embodiments, the controller 140 and/or one or more components thereof, such as the sensor management circuit 210, the aftertreatment control circuit 212, and/or the engine control circuit 214, is/are configured to perform method 300. For example, the controller 140 and/or one or more components thereof may be structured to perform the method 300, alone or in combination with other devices such as the sensors 125 and/or other components of the system 100. The method 300 may include inputs and/or outputs to/from one or more user devices, such as the operator I/O device 130. In the embodiment shown in FIG. 3A, the method 300 is performed by the controller 140.

As an overview of method 300, at process 302, the controller 140 receives initial sensor data. At process 304, the controller 140 compares the initial sensor data with a first threshold. If the initial sensor data is above a maximum threshold, below a minimum threshold, or outside a predefined threshold range, the method 300 continues to process 306. If the initial sensor data is not above the maximum threshold, below the minimum threshold, or outside the threshold range, the method 300 returns to process 302. At process 306, the controller 140 controls the engine 101 to a first engine output. At process 308, the controller 140 receives first sensor data. At process 310, the controller 140 controls the engine 101 to a second engine output. At process 312, the controller 140 receives second sensor data. At process 314, the controller 140 controls the engine to a third engine output. At process 316, the controller 140, controls the engine to the first engine output. At process 318, the controller 140 receives third sensor data. At process 320, the controller 140 controls the engine to the second engine output. At process 322, the controller 140 receives fourth sensor data. At process 324, the controller 140 determines a diagnosis. In some embodiments, the method 300 may continue to process 402 of the method 400 of FIG. 4. In some embodiments, the processes of the method 300 may be performed in a different order than as shown in FIG. 3A. In some embodiments, the method 300 may include more or fewer processes than as shown in FIG. 3A. In some embodiments the processes of the method 300 may be performed concurrently, partially concurrently, or sequentially.

Referring to the method 300 in more detail, at process 302, the controller 140 receives initial sensor data. The controller 140 may determine, based on the initial sensor data one or more parameter values of the aftertreatment system 120. For example, the initial sensor data may include information indicative of at least one of a deNOx value, a reductant value, an ANR value, an EONOx value, and/or other parameter values regarding operation of the aftertreatment system 120. In an example embodiment, the initial sensor data includes information indicative of a deNOx value. As described above, the initial sensor data may include data from the sensors 125, and the initial sensor data may be data sensed by an actual sensor, determined by a virtual sensor, or a combination thereof.

At process 304, the controller 140 compares the initial sensor data with a first threshold. More specifically, the controller 140 may compare the initial parameter value with the first threshold. The first threshold may correspond to the type of parameter value determined based on the initial sensor data. For example, if the initial sensor data includes information indicative of a deNOx value, the first threshold may be a first deNOx threshold. As described above, the first threshold may include a maximum threshold, a minimum threshold, and/or a threshold range. In an example embodiment, the initial sensor data includes information indicative of a deNOx value and the first threshold is a minimum deNOx value (e.g., a minimum deNOx efficiency value of 90%, 85%, 80%, etc.). The deNOx value may be determined at a particular location in the aftertreatment system 120. For example, the deNOx value may be determined at an outlet of the aftertreatment system 120, at an outlet of the SCR 123, and/or at another location (e.g., tailpipe emission). The deNOx value may be determined by a difference between a NOx value at an inlet of the aftertreatment system 120 ($NOx_{in}$) and a NOx value at an outlet of the aftertreatment system 120 ($NOX_{out}$) divided by the $NOx_{in}$ value. The $NOx_{in}$ and $NOx_{out}$ values may be values included in the initial sensor data (e.g., sensor data detected and/or determined by the sensors 125). If the initial parameter value does not satisfy the first threshold (e.g., above a maximum threshold, below a minimum threshold, or outside a threshold range), the method 300 continues to process 306. For example, if the deNOx value is less than the minimum deNOx value, the method 300 continues to process 306. If the initial sensor data satisfies the first threshold (e.g., below the maximum threshold, above the minimum threshold, or within the threshold range), the method 300 returns to process 302. For example, if the deNOx value is greater than the minimum deNOx value, the method 300 returns to process 302.

At process 306, the controller 140 controls the engine 101 to a first engine output. For example, the engine control circuit 214 of the controller 140 may adjust the operation of the engine 101 such that the engine 101 outputs a first engine output value, as described above with respect to FIG. 2. The engine output value may include at least one of an exhaust gas temperature value, exhaust flow rate value (e.g., mass flow rate, volumetric flow rate, etc.), an engine speed value (e.g., RPM), or other engine output value. In an example embodiment, the engine control circuit 214 may adjust the operation of the engine to obtain or attempt to obtain a first exhaust gas temperature value at an engine output (which may be determined by an engine-out temperature sensor). The first exhaust gas temperature value may be a low temperature value (e.g., less than 300° C., less than 280° C., etc.), a low temperature range (e.g., between 250° C. and 360° C., between 270° C. and 290° C., etc.), or a target temperature value with an error range (e.g., 280° C.±25° C.).

At process 308, the controller 140 receives first sensor data. The first sensor data may include sensor data from the sensors 125. The sensor data may include information indicative of a first deNOx value that corresponds to the first engine output value such that the controller 140 can determine the first deNOx value based on the first sensor data. In some embodiments, the first sensor data is received, collected, and/or otherwise determined in response to the engine 101 operating at the first engine output value.

At process 310, the controller 140 controls the engine 101 to a second engine output. For example, the engine control circuit 214 of the controller 140 may adjust the operation of the engine 101 such that the engine 101 outputs a second engine output value, as described above with respect to FIG. 2. The engine output value may include at least one of an exhaust gas temperature value, exhaust flow rate value (e.g., mass flow rate, volumetric flow rate, etc.), engine speed value (e.g., RPM), or other engine output value. In an example embodiment, the engine control circuit 214 may adjust the operation of the engine to a second temperature value. The second temperature value may be a moderate temperature value (e.g., less than 400° C., less than 350° C., etc.), a moderate temperature range (e.g., between 300° C. and 400° C., between 340° C. and 360° C., etc.), or a target temperature value with an error range (e.g., 350° C.±25° C.).

At process 312, the controller 140 receives second sensor data. The second sensor data may include sensor data from the sensors 125. The second sensor data may include information indicative of a second deNOx value that corresponds to the second engine output value such that the controller 140 can determine the second deNOx value based on second first sensor data. In some embodiments, the second sensor data is received, collected, and/or otherwise determined in response to the engine 101 operating at the second engine output value.

At process 314, the controller 140 controls the engine to a third engine output. For example, the engine control circuit 214 of the controller 140 may adjust the operation of the engine 101 such that the engine 101 outputs a third engine output value, as described above with respect to FIG. 2. The engine output value may include at least one of an exhaust gas temperature value, exhaust flow rate value (e.g., mass flow rate, volumetric flow rate, etc.), engine speed value (e.g., RPM), or other engine output value. In an example embodiment, the engine control circuit 214 may adjust the operation of the engine to a third exhaust gas temperature value. The third exhaust gas temperature value may be a high temperature value (e.g., more than 400° C., more than 450° C., etc.), a high temperature range (e.g., between 400° C. and 500° C., between 425° C. and 475° C., etc.), or a target temperature value with an error range (e.g., 450° C.±25° C.).

At process 316, the controller 140, controls the engine to the first engine output. As described above with respect to process 306, the engine control circuit 214 of the controller 140 may adjust the operation of the engine 101 such that the engine 101 outputs the first engine output value.

At process 318, the controller 140 receives third sensor data. The third sensor data may include sensor data from the sensors 125. The third sensor data may include information indicative of a third deNOx value that corresponds to the first engine output value, after the engine was previously in the third engine output such that the controller 140 can determine the third deNOx value based on the third sensor data. In some embodiments, the third sensor data is received in response to the engine 101 operating at the first engine output value after recently (e.g., within 1 minute, within 30 minutes, within 1 hour, etc.) operating at the third engine output value.

At process 320, the controller 140 controls the engine to the second engine output. As described above with respect to process 310, the engine control circuit 214 of the controller 140 may adjust the operation of the engine 101 such that the engine 101 outputs the second engine output value.

At process 322, the controller 140 receives fourth sensor data. The fourth sensor data may include sensor data from the sensors 125. The fourth sensor data may include information indicative of a fourth deNOx value that corresponds to the second engine output value, after the engine was previously in the third engine output such that the controller 140 can determine the fourth deNOx value based on the fourth sensor data. In some embodiments, the fourth sensor data is received in response to the engine 101 operating at the second engine output value (e.g., within 1 minute, within 30 minutes, within 1 hour, after a steady-state condition at the second engine output value where that value fluctuates within a predefined acceptable amount, etc.).

At process 324, the controller 140 identifies or otherwise determines a diagnosis. In one embodiment, the controller 140 may determine the diagnosis based on the first sensor data, the second sensor data, the third sensor data, and the fourth sensor data. In another embodiment, the controller 140 may determine the diagnosis based one or more (a predefined combination) of the first sensor data, the second sensor data, the third sensor data, and the fourth sensor data. In some embodiments, the controller 140 compares each of the first sensor data, the second sensor data, the third sensor data, and the fourth sensor data to corresponding respective thresholds. As described above, the corresponding threshold may be a maximum threshold, a minimum threshold, or a threshold range. The controller 140 may determine whether each of the first sensor data, the second sensor data, the third sensor data, and the fourth sensor data is above a predefined maximum threshold, is below a predefined minimum threshold, or outside a predefined acceptable threshold range. In some embodiments, diagnosis may be a preliminary diagnosis that indicates that further data is required to determine the failure type or potential failure type. In other embodiments, the diagnosis may be a final diagnosis that indicates a most likely failure type based on the data received by the controller 140, and that no additional data is required. Examples of determining the diagnosis and failure types are described herein with respect to FIG. 3B.

In one embodiment, the controller 140 may use one or more of a statistical model, a machine learning model, a lookup table, etc. to determine the diagnosis. In an example embodiment, the controller 140 uses a lookup table to determine the diagnosis. For example and with reference to FIG. 3B, the lookup table includes inputs of the first sensor data, the second sensor data, the third sensor data, and the fourth sensor data and an output of a failed component and/or failure type. In particular, the lookup table includes inputs of a determination of whether each of the sensor data satisfies a corresponding threshold (e.g., the parameter is above a maximum threshold, below a minimum threshold, or outside a predefined threshold range).

Now referring to FIG. 3B, a lookup table 350 that includes one or more inputs that provide an indication of whether the first sensor data, the second sensor data, the third sensor data, and the fourth sensor data each satisfies a corresponding threshold is shown, according to an example embodiment. As shown in FIG. 3B and as described herein with respect to FIG. 3A, the first sensor data and the second sensor data are measured (or determined) before the engine operates at the third engine output value. More specifically, the first sensor data and the second sensor data are measured (or determined) prior to a predefined high temperature operating condition. For example, the first data is measured (or determined) at a low engine output temperature (e.g., at or around 280° C.), and the second data is measured (or determined) at a moderate engine output temperature (e.g., at or around 350° C.). The controller 140 may determine a first CE ($CE_1$) based on the first sensor data and a second CE ($CE_2$) based on the second sensor data. In this example, the low engine output temperature and moderate engine output temperature refer to engine-out exhaust gas temperatures, which may be determined by engine out temperature sensors (positioned in or near the exhaust gas manifold). After the first data and the second data are measured (or determined), the controller 140 causes the engine 101 to operate at the high temperature operating condition (e.g., a high temperature event or the third engine output). The high temperature operating condition may be a high exhaust gas temperature, a high aftertreatment system component temperature, etc. In some embodiments, the high temperature is defined as a temperature greater than 450° C. (which may be an exhaust gas temperature for exhaust gas entering the aftertreatment system 120). In some embodiments, the high temperature event causes deposits on the DPF 122 to burn off and/or sulfur to burn off the SCR system 123. In this regard, the "high temperature" may be a high temperature threshold (e.g., exhaust gas temperature, exhaust aftertreatment system component temperature, a combination thereof, etc.) or high temperature event, such as a regeneration event (which may be dependent on the regeneration intent (e.g., burn off sulfur versus a deep clean of other particulate matter, etc.)).

The third sensor data and the fourth sensor data are measured (or determined) after the engine operates at the third output. More specifically, the third sensor data and the fourth sensor data are measured (or determined) after the high temperature event. In some embodiments, the third sensor data and the fourth sensor data are measured (or determined) after steady-state conditions are reached (e.g., a predetermined time period after the predefined high temperature event or when sensor data indicates steady-state conditions are reached after the high temperature event). For example, the third data is measured (or determined) at a low engine output temperature (e.g., at or around 280° C.) after the high temperature event, and the fourth data is measured (or determined) at a moderate engine output temperature (e.g., at or around 350° C.) after the high temperature event. The controller 140 may determine a third CE ($CE_3$) based on the third sensor data and a fourth CE ($CE_4$) based on the fourth sensor data. As described in more detail herein, the lookup table 350 compares a first sensor data to a first threshold, a second sensor data to a second threshold, a third sensor data to a third threshold, and a fourth sensor data to a fourth threshold. Each of the first sensor data, the second sensor data, the third sensor data, and the fourth sensor data include a parameter value. In some embodiments, each of the first sensor data, the second sensor data, the third sensor data, and the fourth sensor data includes or is a CE value. In these embodiments, the first threshold, the second threshold, the third threshold, and the fourth threshold may be a predefined CE threshold (e.g., a minimum CE value). In other embodiments, the sensor data and the thresholds may correspond to a different parameter (e.g., a NOx value, an EONOx value, a temperature value, etc.).

As shown in FIG. 3B, in a first scenario, when the first sensor data does not satisfy the first threshold, the second sensor data satisfies the second threshold, the third sensor data satisfies the third threshold, and the fourth sensor data satisfies the fourth threshold, the controller 140 determines that the aftertreatment system 120 has failed by a first failure type. For example, if $CE_1$ is less than 85%, $CE_2$ is greater than 85%, $CE_3$ is greater than 85%, and $CE_4$ is greater than 85%, the controller 140 determines that the aftertreatment system 120 has failed by the first failure type. In an example embodiment, the first failure type is a high sulfur poisoning failure type. The high sulfur poisoning failure type may be caused by a bad or low quality fuel, which is based on the fuel having a high sulfur concentration (a sulfur concentration above a predefined threshold which is indicative of a bad or low quality fuel). The high sulfur concentration in the fuel in turn causes the engine exhaust gas to have a higher concentration of sulfur oxides (SOx). The increased SOx may "poison" one or more components of the aftertreatment system 120, such as the DOC 121 and/or the SCR 123. As used herein, "sulfur poisoning" of an aftertreatment system component may include an increased amount of sulfur oxide value (e.g., amount, concentration, etc.) at, on, or within the component. The increased sulfur oxide value may result in formation of ammonium sulfate at low temperatures (e.g., temperatures less than a predefined threshold, such as 300° C.). The increased sulfur oxide value may also cause the one or more components to adsorb at least a portion of the SOx, such as on active sites of the SCR along with the formation of copper sulfate species. In turn, the adsorption may reduce the effectiveness of the one or more components (e.g., hinder the ability of the SCR to convert NOx to less harmful elements). In some embodiments, the high sulfur poisoning failure type may be mitigated or remedied by increasing the exhaust gas temperature within the exhaust aftertreatment system 120 above a threshold temperature (e.g., greater than 550° C.). These relatively high exhaust gas temperatures for a certain period of time may function to restore SCR activity of the sulfated catalyst.

In a second scenario, when the first sensor data does not satisfy the first threshold, the second sensor data satisfies the second threshold, the third sensor data does not satisfy the third threshold, and the fourth sensor data satisfies the fourth threshold, the controller 140 determines that the aftertreatment system 120 has failed by a second failure type. For example, if $CE_1$ is less than 85%, $CE_2$ is greater than 85%, $CE_3$ is less than 85%, and $CE_4$ is greater than 85%, the controller 140 determines that the aftertreatment system 120 has failed by the second failure type. In an example embodiment, the second failure type is an over aged part failure type. For example, one or more of the components of the aftertreatment system 120 has over aged (e.g., degraded) to the point where the component is no longer effective. For example, one or more components may become hydrothermally aged. Hydrothermal aging may be caused by exposure to high temperatures (e.g., greater than 550° C.) over long periods of time and/or repeated exposure to high temperatures. A hydrothermally aged component may be unrecoverable.

In a third scenario, when the first sensor data does not satisfy first threshold, the second sensor data does not satisfy the second threshold, the third sensor data satisfies the third threshold, and the fourth sensor data satisfies the fourth threshold, the controller 140 determines that the aftertreatment system 120 has failed by a third failure type. For example, if $CE_1$ is less than 85%, $CE_2$ is less than 85%, $CE_3$ is greater than 85%, and $CE_4$ is greater than 85%, the controller 140 determines that the aftertreatment system 120 has failed by the third failure type. In an example embodiment, the third failure type is a deposit failure type. For example, contaminants, such as soot, may build up and "deposit" on one or more of the components of the aftertreatment system 120. More specifically, a soot deposit may accumulate on the DPF 122 such that the DPF 122 has degraded in performance (e.g., pressure differential across the DPF 122 exceeds a predefined threshold, which indicates that there is a flow restriction through the DPF 122). The increased exhaust gas temperature resolves the deposit failure type by burning off the deposit and allowing the DPF 122 to operate normally.

In a fourth scenario, when the first sensor data does not satisfy the first threshold, the second sensor data does not satisfy the second threshold, the third sensor data does not satisfy the third threshold, and the fourth sensor data does not satisfy the fourth threshold, the controller 140 determines that the aftertreatment system 120 has failed by a fourth failure type. For example, if $CE_1$ is less than 85%, $CE_2$ is less than 85%, $CE_3$ is less than 85%, and $CE_4$ is less than 85%, the controller 140 determines that the aftertreatment system 120 has failed by the fourth failure type. In an example embodiment, the fourth failure type is a dosing failure type. In some embodiments, the controller 140 requires more data to determine a specific type of dosing failure. The controller 140 is structured to determine the specific dosing failure type using the method 400, described herein with respect to FIG. 4.

Referring now to FIG. 4, a flow diagram of a method 400 of monitoring an aftertreatment system for the vehicle of FIG. 1 is shown, according to an example embodiment. In some embodiments, the controller 140 and/or one or more components thereof, such as the aftertreatment control circuit 212 and/or the engine control circuit 214 is/are configured to perform method 400. For example, the controller 140 and/or one or more components thereof may be structured to perform the method 400, alone or in combination with other devices such as the sensors 125 and/or other components of the system 100. The method 400 may include inputs and/or outputs to/from one or more user devices, such as the operator I/O device 130. In the embodiment shown in FIG. 4, the method 400 is performed by the controller 140.

As an overview of method 400, at process 402, the controller 140 controls the engine to a fourth engine output. At process 404, the controller 140 receives fifth sensor data. At process 406, the controller 140 compares the fifth sensor data with a fifth threshold. If the fifth sensor data is at or below the fifth threshold (depending on the parameter threshold, the fifth sensor data may not meet the fifth threshold by, e.g., being above a maximum threshold or below a minimum threshold), the method 400 continues to process 414. If the fifth sensor data satisfies the fifth threshold (e.g., below a maximum threshold, above a minimum threshold, within a threshold range), the method 400 continues to process 408. At process 408, the controller 140 requests an override sequence. At process 410, the controller 140 estimates a dosing concentration based on sensor data from the override sequence. At process 412, the controller 140 compares the dosing concentration with a sixth threshold. At process 414, the controller 140 determines a diagnosis. In some embodiments, the processes of the method 400 may be performed in a different order than as shown in FIG. 4. In some embodiments, the method 400 may include more or fewer processes than as shown in FIG. 4. In some embodiments the processes of the method 400 may be performed concurrently, partially concurrently, or sequentially.

Referring to the method 400 in more detail, at process 402, the controller 140 controls the engine 101 to a fourth engine output. For example, the engine control circuit 214 of the controller 140 may adjust the operation of the engine 101 such that the engine 101 outputs a fourth engine output value, as described above with respect to FIG. 2. The engine output value may include at least one of an exhaust gas temperature value, an exhaust flow rate value (e.g., mass flow rate, volumetric flow rate, etc.), an engine speed value (e.g., RPM), or other engine output value. In an example embodiment, the fourth engine output is a predetermined engine output that corresponds to a predetermined EONOx value or range of EONOx values.

At process 404, the controller 140 receives fifth sensor data. The fifth sensor data may include sensor data from the sensors 125. The sensor data may include a first EONOx value that corresponds to sensor data taken while the engine 101 is operating at the fourth engine output value. In some embodiments, the fifth sensor data, including the first EONOx value, is measured downstream of the engine 101. In some embodiments, the fifth sensor data, including the first EONOx value, is measured or determined upstream of the aftertreatment system 120 and/or upstream of a first component of the aftertreatment system 120.

At process 406, the controller 140 compares the fifth sensor data with a fifth threshold. If the fifth sensor data does not satisfy the fifth threshold (e.g., above a maximum threshold, below a minimum threshold, outside a threshold range), the method 400 continues to process 414. If the fifth sensor data satisfies the fifth threshold (e.g., below a maximum threshold, above a minimum threshold, within a threshold range), the method 400 continues to process 408. In some embodiments, the fifth threshold is a threshold range. More specifically, the fifth threshold is a range of EONOx values that correspond to the fourth engine output value. If the fifth sensor data is outside of the threshold range, the method 400 continues to process 414. If the fifth sensor data is within the threshold range, the method 400 continues to process 408.

At process 408, the controller 140 requests and initiates an override process for operation of the system. The override process may include causing the dosing module 124 to override a standard dosing value and provide at least one, and particularly a plurality of, dosing values according to the override sequence. For example, the controller 140 may cause the dosing module 124 to output a plurality of ANR values. In an example embodiment, the override sequence includes a first dosing value of approximately 0.8 ANR, a second dosing value of approximately 1.0 ANR, and a third dosing value of approximately 1.2 ANR. In other embodiments, the override sequence may include more, different, or fewer dosing values that correspond to ANR values between 0 and a predefined value, such as between 0.5 and 1.5

For each of the dosing values of the override sequence, the controller 140 may receive override sequence sensor data (e.g., from the sensors 125). The override sequence sensor data may include information indicative of a deNOx value (e.g., a deNOx efficiency) for each of the dosing values. More specifically, the controller 140 may receive sensor data indicative of a first deNOx value that corresponds with the first dosing value (e.g., approximately 0.7 ANR-0.8 ANR), a second deNOx value that corresponds with the second dosing value (e.g., approximately 1.0 ANR), and a third deNOx value that corresponds with the third dosing value (e.g., approximately 1.2 ANR).

In some embodiments, the deNOx CE values determined at each dosing value may be compared to one or more expected deNOx values to determine if the aftertreatment system 120 is operating in normal conditions, negative conditions, or positive conditions. The controller 140 may determine a condition of the aftertreatment system 120 based on the difference between the deNOx value and the expected deNOx CE value at least one predefined dosing value.

In an example embodiment, the one or more expected deNOx values for the first dosing value may be include a first normal condition value (e.g., 0.68 deNOx CE), a first negative condition value (0.58 deNOx CE), and a first positive condition value (e.g., 0.78 deNOx CE). The one or more expected deNOx values for the second dosing value may be include a second normal condition value (e.g., 0.97 deNOx CE), a second negative condition value (0.87 deNOx CE), and a second positive condition value (e.g., 0.97 deNOx CE). The one or more deNOx values for the third dosing value may be include a third normal condition value (e.g., 0.95 deNOx CE), a second negative condition value (0.96 deNOx CE), and a first positive condition value (e.g., 0.90 deNOx CE). In this example, three predefined dosing values with three associated expected deNOx CE values are used to determine, by the controller 140, a normal condition, a negative condition, or a positive condition for the system. If the determined deNOx values are within a predefined amount (e.g., ten percent, fifteen percent, etc.) of the expected deNOx values at each dosing value, then the controller 140 may determine the condition of the system.

At process 410, the controller 140 estimates or otherwise determines a dosing concentration based on sensor data from the override sequence. The dosing concentration may be determined based on a combination of an engine-out NOx amount value, a dosing command value, and a system out NOx amount value. In particular, the dosing or urea concentration may be determined based on the data obtained during the override sequence. In particular, the dosing concentration is determined based on one or more sensor values and/or one or more dosing commands. For example, the controller 140 may determine a first value ("M1") indicative of an EONOx mass flow rate value. M1 may be determined based on data from one or more sensors 125 (e.g., a NOx sensor disposed at an outlet of the engine 101). The controller 140 may determine a second value ("M2") indicative of a system out NOx (SONOx) mass flow rate value. M2 may be determined based on data from one or more sensors 125 (e.g., a NOx sensor at an outlet of the aftertreatment system 120—i.e., a system-out NOx value). A third value ("M3") may be a dosing command value (e.g., a dosing amount in mass) commanded by the controller 140. The controller 140 may determine a fourth value ("M4") indicative of a reacted NOx mass. M4 may be determined as the difference between M1 and M2. The controller 140 may determine a fifth value ("M5") indicative of an amount (e.g., mass) of reacted dosing fluid based on the amount of reacted NOx. For example, based on M1 and M2, the controller 140 may determine an amount of NOx that reacted with the dosing fluid. More specifically, the controller 140 may determine a mass of the NOx that reacted with the dosing fluid based on a difference between M1 and M2. The controller 140 may determine a molar amount of NOx that reacted with the dosing fluid. The controller 140 may determine a molar amount of dosing fluid based on the molar amount of NOx. In some embodiments, the dosing fluid is ammonia ($NH_3$). In these embodiments, the molar ratio between NOx and $NH_3$ is 1:1 or approximated as 1:1, as shown below in equations 1-4.

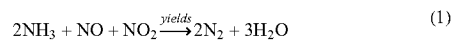  (1)

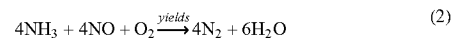  (2)

  (3)

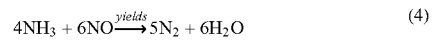  (4)

The controller 140 may determine, based on the molar amount of dosing fluid, a mass of the reacted dosing fluid. Subsequently, the controller 140 may determine the dosing concentration based on a ratio of the amount of reacted dosing fluid relative to the commanded amount of dosing fluid (e.g., M5 divided by M3). These formulas may be saved in a look-up table or other retrievable algorithm in the controller 140 for selective execution.

At process 412, the controller 140 compares the dosing concentration with a sixth threshold. The sixth threshold may be a threshold range of dosing concentration. The controller 140 may determine, based on the dosing concentration satisfying or not satisfying the sixth threshold, a diagnosis. In particular, at process 414, the controller 140 determines a diagnosis. As described above, the controller 140 may determine a type of dosing variation (e.g., the fourth failure type described herein with respect to FIG. 3B).

In a first example embodiment, based on determining, at process 406, that the EONOx value does not satisfy the fifth threshold, the controller 140 may determine that the aftertreatment system 120 has failed by a first dosing failure type. The first dosing variation failure type is a sensor drift failure type. For example, because the engine 101 is operating at a predetermined engine output value, if the sensors 125 detect an EONOx value that is different from an expected EONOx value, the controller 140 may determine that the sensors 125 have failed due to sensor drift. "Sensor drift" refers to a situation where an accuracy of a sensor, such as the sensors 125, decreases over time. Sensor drift may be caused by damage to a sensor (e.g., corrosion, electrical damage, particulate ingress, water damage, etc.), normal wear over time, or other factors.

In a second example embodiment, based on determining that the dosing concentration does not satisfy the sixth threshold (e.g., outside the threshold range), the controller 140 may determine that the aftertreatment system 120 has failed by a second dosing variation failure type. The second dosing variation failure type is dosing concentration failure type. For example, if an expected amount of dosing fluid was used to achieve the ANR values of the override sequence, but the estimated dosing concentration does not satisfy the sixth threshold, the controller 140 may determine that the dosing fluid is either too concentrated or too dilute.

In a third example embodiment, based on determining that the dosing concentration satisfies the sixth threshold (e.g., within the threshold range), the controller 140 may determine that the aftertreatment system 120 has failed by a second dosing variation failure type. The second dosing variation failure type is dosing leakage or dosing drift failure type. For example, if the estimated dosing concentration satisfies the sixth threshold and an unexpected amount of dosing fluid was used to achieve the ANR values of the override sequence, the controller 140 may determine at least one of (i) the dosing module 124 failed due to dosing drift or (ii) the dosing module 124 is leaking dosing fluid. Dosing drift refers to a situation where a commanded dosing value (e.g., dosing amount, dosing volume, etc.) differs from a delivered dosing value, where the difference increases over time. Dosing drift may be caused by damage to a sensor, a pump, or other component of the dosing module 124.

In any of the above described embodiments, the controller 140 may be configured to generate an alert that includes an indication that one or more components of the aftertreatment system 120 has failed. The indication may further include the component that failed and/or the failure type. The indication may be provided to a user via the operator I/O device 130. In some embodiments, the indication may be provided to a remote computing system (e.g., a fleet operator computing system, etc.).

In some embodiments, the indication may further include a suggested or recommended course of action to remedy the failed component or mitigate future failure. In one example, to mitigate a high sulfur positioned failure type, the indication may include a recommendation to operate the engine 101 at a high temperature to burn off built up sulfur. In another example, to mitigate an over aged part failure, the indication may include a recommendation to repair or replace one or more parts of the aftertreatment system 120. In another example, to mitigate a deposit failure, the indication may include a recommendation to operate the engine 101 at a high temperature to burn off built up deposit. In another example, to mitigate sensor drift failure, the indication may include a recommendation to calibrate or replace one or more of the sensors 125. In another example, to mitigate a dosing concentration failure, the indication may include a recommendation to replace the dosing fluid. In another example, to mitigate a dosing leakage or dosing drift, the indication may include a recommendation to repair or replace the dosing module 124.

In some embodiments, the controller 140 may be configured to automatically provide the indication to a remote computing system. For example, the controller 140 may provide a fault code, or other notification indicative of the failure type to a remote computing system. In some embodiments, the controller 140 may also provide the recommended course of action to remedy the failed component or mitigate future failure.

In some embodiments, the controller 140 may be configured to control the engine 101 based on the diagnosis. For example, the controller 140 may automatically increase an engine exhaust gas temperature (e.g., by increasing the engine speed) to burn off built up deposit on the DPF 122. In another example, the controller 140 may cause the system 100 to rely more on the electric motor 102 to mitigate emissions based on a determined faulty component by utilizing the internal combustion engine a relatively lesser amount.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the sensor management circuit 210 and/or the aftertreatment modeling circuit 212 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system, comprising:
an exhaust aftertreatment system coupled to an engine system such that the exhaust aftertreatment system receives exhaust gas from the engine system;
at least one sensor; and
at least one processing circuit coupled to the at least one sensor and the exhaust aftertreatment system, the at least one processing circuit structured to:
receive an indication to diagnose at least one component of the exhaust aftertreatment system; and
perform operations to diagnose the at least one component of the exhaust aftertreatment system responsive to receiving the indication, the operations comprising:
causing the engine system to operate through a sequence of a plurality of engine outputs;
receiving, from the at least one sensor, a first set of sensor data corresponding to a first engine output;
comparing the first set of sensor data to a first threshold; and
diagnosing the at least one component based on the comparison between the first set of sensor data and the first of threshold, the diagnosis indicating a failure type.

2. The system of claim 1, wherein the causing the engine system to operate through the sequence of the plurality of engine outputs comprises:
causing the engine system to operate at the first engine output;
causing the engine system to operate at a second engine output; and
causing the engine system to operate at a third engine output;
wherein at least one of the first engine output, the second engine output, or the third engine output differs from another of the first engine output, the second engine output, or the third engine output.

3. The system of claim 2, wherein the at least one processing circuit is further structured to receive:
a second set of sensor data corresponding to the second engine output;
a third set of sensor data corresponding to the first engine output after the third engine output; and
a fourth set of sensor data corresponding to the second engine output after the third engine output.

4. The system of claim 3, wherein the failure type is at least one of:
a first failure type determined, by the at least one processing circuit, based on the first set of sensor data not satisfying a first threshold, the second set of sensor data satisfying a second threshold, the third set of sensor data satisfying a third threshold, and the fourth set of sensor data satisfying a fourth threshold, the first failure type indicative of a high sulfur poisoning failure type;
a second failure type determined, by the at least one processing circuit, based on the first set of sensor data not satisfying the first threshold, the second set of sensor data satisfying the second threshold, the third set of sensor data not satisfying the third threshold, and the fourth set of sensor data satisfying the fourth threshold, the second failure type indicative of an overaged part failure type;
a third failure type determined, by the at least one processing circuit, based on the first set of sensor data not satisfying the first threshold, the second set of sensor data not satisfying the second threshold, the third set of sensor data satisfying the third threshold, and the fourth set of sensor data satisfying the fourth threshold, the third failure type indicative of a deposit failure type; or
a fourth failure type determined, by the at least one processing circuit, based on the first set of sensor data not satisfying the first threshold, the second set of sensor data not satisfying the second threshold, the third set of sensor data not satisfying the third threshold, and the fourth set of sensor data not satisfying the fourth threshold, the fourth failure type indicative of a dosing failure type.

5. The system of claim 2, wherein:
the first engine output corresponds with a first exhaust gas temperature value;
the second engine output corresponds with a second exhaust gas temperature value, greater than the first temperature value; and
the third engine output corresponds with a third exhaust gas temperature value, greater than the second temperature value.

6. The system of claim 1, wherein the failure type is at least one of:
a first failure type indicative of high sulfur poisoning;
a second failure type indicative of an overaged part;
a third failure type indicative of a deposit failure; or
a fourth failure indicative of a dosing failure.

7. The system of claim 6, wherein the at least one processing circuit is further structured to:
cause the engine system to operate at a fourth engine output responsive to determining that the failure type is the fourth failure type;
receive, from the at least one sensor, additional sensor data; and
diagnose the at least one component based on comparing the additional sensor data to a corresponding threshold.

8. The system of claim 7, wherein the fourth engine output corresponds to a predetermined engine output exhaust gas constituent value.

9. A method for diagnosing at least one component in an exhaust aftertreatment system, the method comprising:
causing an engine to operate through a sequence of a plurality of engine outputs;
receiving a first set of sensor data corresponding to a first engine output of the plurality of engine outputs and a second set of sensor data corresponding to a second engine output of the plurality of engine outputs;
comparing the first set of sensor data to a first threshold and the second set of sensor data to a second threshold; and
diagnosing the at least one component based on the comparison, the diagnosis indicating a first failure type based on the comparison indicating that the second set of sensor data satisfies the second threshold.

10. The method of claim 9, wherein the causing the engine to operate through the sequence of the plurality of engine outputs comprises:
causing the engine to operate at the first engine output, the first engine output corresponding to a first temperature value;
causing the engine to operate at the second engine output, the second engine output corresponding to a second temperature value, greater than the first temperature value; and
causing the engine to operate at a third engine output, third engine output corresponding to a third temperature value, greater than the second temperature value;

wherein each of the first, second, and third temperature values are exhaust gas temperature values.

11. The method of claim 10, further comprising:
receiving a third set of sensor data, responsive to the first engine output after the third engine output; and
receiving a fourth set of sensor data received responsive to the second engine output after the third engine output.

12. The method of claim 11, wherein the failure type is at least one of:
the first failure type based on the first set of sensor data not satisfying the first threshold, the second set of sensor data satisfying the second threshold, the third set of sensor data satisfying a third threshold, and the fourth set of sensor data satisfying a fourth threshold, the first failure type indicative of a high sulfur poisoning failure type;
a second failure type based on the first set of sensor data not satisfying the first threshold, the second set of sensor data satisfying the second threshold, the third set of sensor data not satisfying the third threshold, and the fourth set of sensor data satisfying the fourth threshold, the second failure type indicative of an over aged part failure type;
a third failure type based on the first set of sensor data not satisfying the first threshold, the second set of sensor data not satisfying the second threshold, the third set of sensor data satisfying the third threshold, and the fourth set of sensor data satisfying the fourth threshold, the third failure type indicative of a deposit failure type; or
a fourth failure type based on the first set of sensor data not satisfying the first threshold, the second set of sensor data not satisfying the second threshold, the third set of sensor data not satisfying the third threshold, and the fourth set of sensor data not satisfying the fourth threshold, the fourth failure type indicative of a dosing failure type.

13. The method of claim 12, further comprising:
causing the engine to operate at a fourth engine output responsive to determining that the failure type is the fourth failure type;
receiving additional sensor data; and
diagnosing the at least one component based on comparing the additional sensor data to a corresponding threshold.

14. The method of claim 13, wherein the fourth engine output corresponds to a predetermined engine output exhaust gas constituent value.

15. A non-transitory computer readable medium having computer-executable instructions embodied therein that, when executed by at least one processor of a computing system, cause the computing system to perform operations comprising:
causing an engine to operate through a sequence of a plurality of engine outputs;
receiving a plurality of sensor data, each of the plurality sensor data corresponding to at least one of the plurality of engine outputs;
comparing each of the plurality of sensor data to a corresponding threshold of a plurality of thresholds; and
diagnosing the at least one component based on the comparison between the plurality of sensor data and the plurality of thresholds, the diagnosis indicating a failure type.

16. The non-transitory computer-readable medium of claim 15, wherein the causing the engine to operate through the sequence of the plurality of engine outputs comprises:
causing the engine to operate at a first engine output, the first engine output corresponding to a first temperature value;
causing the engine to operate at a second engine output, the second engine output corresponding to a second temperature value, greater than the first temperature value; and
causing the engine to operate at a third engine output, third engine output corresponding to a third temperature value, greater than the second temperature value;
wherein each of the first, second, and third temperature values are exhaust gas temperature values; and
wherein the plurality of sensor data comprises:
a first sensor data received responsive to the first engine output;
a second sensor data received responsive to the second engine output;
a third sensor data received responsive to the first engine output after the third engine output; and
a fourth sensor data received responsive to the second engine output after the third engine output.

17. The non-transitory computer-readable medium of claim 16, wherein the failure type is at least one of:
a first failure type based on the first sensor data not satisfying a first threshold of the plurality of thresholds, the second sensor data satisfying a second threshold of the plurality of thresholds, the third sensor data satisfying a third threshold of the plurality of thresholds, and the fourth sensor data satisfying a fourth threshold of the plurality of thresholds, the first failure type indicative of a high sulfur poisoning failure type;
a second failure type based on the first sensor data not satisfying the first threshold, the second sensor data satisfying the second threshold, the third sensor data not satisfying the third threshold, and the fourth sensor data satisfying the fourth threshold, the second failure type indicative of an over aged part failure type;
a third failure type based on the first sensor data not satisfying the first threshold, the second sensor data not satisfying the second threshold, the third sensor data satisfying the third threshold, and the fourth sensor data satisfying the fourth threshold, the second failure type indicative of a deposit failure type; or
a fourth failure type based on the first sensor data not satisfying the first threshold, the second sensor data not satisfying the second threshold, the third sensor data not satisfying the third threshold, and the fourth sensor data not satisfying the fourth threshold, the second failure type indicative of a dosing failure type.

18. The non-transitory computer-readable medium of claim 17, wherein the instructions, when executed by the at least one processor, further cause operations comprising:
causing the engine to operate at a fourth engine output responsive to determining that the failure type is the fourth failure type;
receiving additional sensor data; and
diagnosing the at least one component based on comparing the additional sensor data to a corresponding threshold;
wherein the fourth engine output corresponds to a predetermined engine output exhaust gas constituent value.

19. The non-transitory computer-readable medium of claim 18, wherein the instructions, when executed by the at least one processor, further cause operations comprising:

responsive to determining that the additional sensor data does not satisfy the corresponding threshold, causing the dosing module to output a plurality of dosing values;

receiving a plurality of conversion efficiency values, wherein each conversion efficiency value of the plurality of conversion efficiency values corresponds to one dosing value of the plurality of dosing values;

determining a dosing concentration value based on at least the plurality of conversion efficiency values; and diagnosing the at least one component the diagnosis indicating:
- a first dosing failure type responsive to the additional sensor data not satisfying the corresponding threshold,
- a second dosing failure type responsive to the dosing concentration value not satisfying a dosing concentration threshold, or
- a third dosing failure type responsive to the dosing concentration value satisfying the dosing concentration threshold and a dosing amount being greater than a corresponding dosing value of the plurality of dosing values.

20. The non-transitory computer-readable medium of claim 19, wherein the plurality of dosing values comprises a first dosing value of 0.8, a second dosing value of 1.0, and a third dosing value of 1.2.

* * * * *